E. S. CARY.
METERING DEVICE.
APPLICATION FILED AUG. 14, 1917.
1,310,739.
Patented July 22, 1919.
2 SHEETS—SHEET 2.
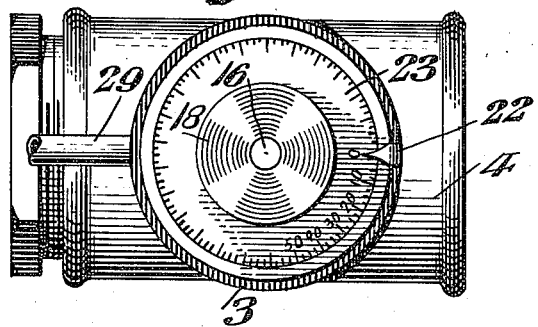
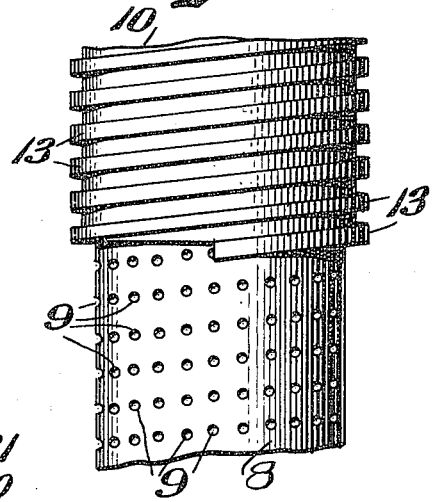
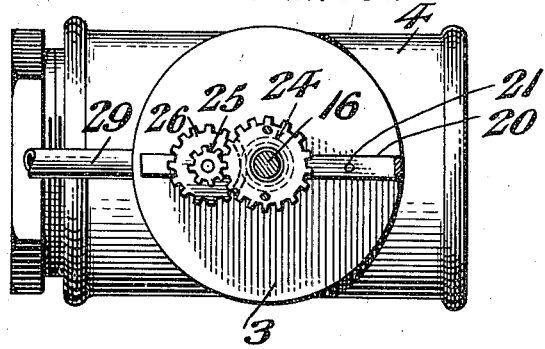
Inventor
Egbert S. Cary.
By Robert M. Barr
Attorney

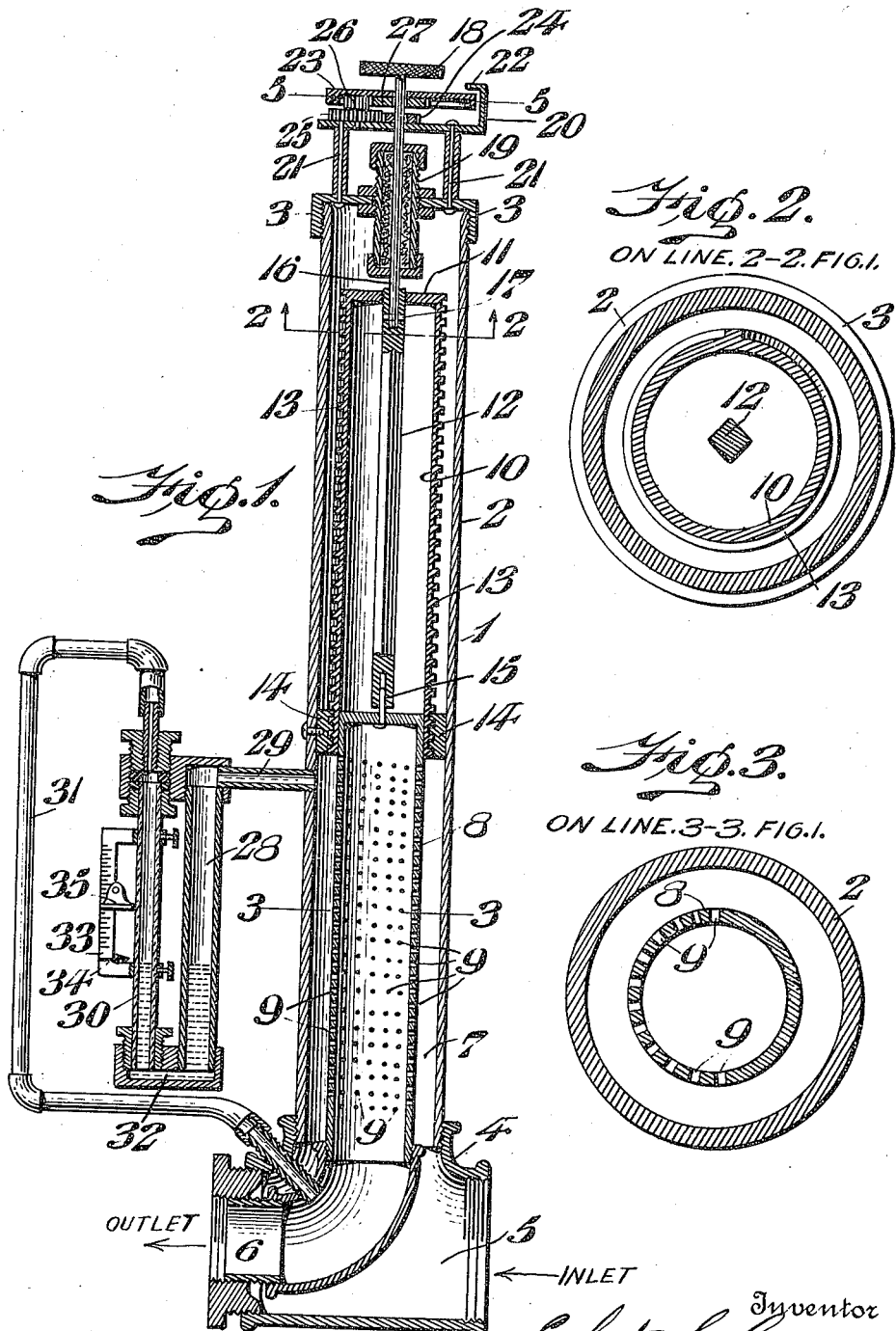

UNITED STATES PATENT OFFICE.

EGBERT S. CARY, OF PHILADELPHIA, PENNSYLVANIA.

METERING DEVICE.

1,310,739.   Specification of Letters Patent.   Patented July 22, 1919.

Application filed August 14, 1917. Serial No. 186,120.

*To all whom it may concern:*

Be it known that I, EGBERT S. CARY, a citizen of the United States, residing at Philadelphia, in the county of Philadelphia and State of Pennsylvania, have invented a certain new and useful Improvement in Metering Devices, of which the following is a specification.

The present invention relates to meters for determining and indicating the flow of gases or fluids and relates more particularly to an air meter of the adjustable orifice type working under the principle that the volume flowing under small constant head through multiple orifices of the same size and shape, is directly proportional to the number of orifices exposed to the flow.

It is an object of the invention to provide a metering device for compressed air, gases or fluids whereby a positive direct reading measure of fluid flow is obtainable which is accurately compensated in relation to the difference of pressures.

It is a further object of the invention to provide a metering device which is properly calibrated to known fluid currents and certain fixed differences of pressure as indicated by pressure gages whereby the degree of orifice opening becomes a measure of the current flow.

It has for a further object to provide, in a metering device, means for correcting scale readings for different densities and temperatures whereby any fixed difference of pressure taken as a base can be varied so that the measure of gas flow can be accurately compensated with respect to the orifice opening to give a true reading of current flow irrespective of differences in density due to pressure and temperature.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1 represents a sectional elevation of a meter embodying my invention.

Fig. 2 represents a section on line 2—2 of Fig. 1.

Fig. 3 represents a section on line 3—3 of Fig. 1.

Fig. 4 represents an end elevation showing the control hand wheel and indicating dial.

Fig. 5 represents a section on line 5—5 of Fig. 1.

Fig. 6 represents a detail in side elevation of a portion of the cut-off valve.

1 designates generally the casing of the device which, in the present instance, has the body portion 2 formed of a length of pipe and its ends closed by a cap 3 and T fitting 4, the latter having the inlet 5 and the outlet 6 as will be apparent.

7 designates a receiving chamber for the air, gas or the like, formed between the casing body 2 and the metering cylinder 8, this latter having communication with the outlet 6 and being provided with a plurality of orifices 9 arranged in a predetermined manner in its walls. As here shown the metering cylinder 8 is concentrically arranged with respect to the body 2 and is sufficiently less in diameter to provide a receiving chamber 7 of proper dimensions for the purpose intended. It will be understood that the inlet 5 has free communication with the chamber 7 and discharges directly thereto in the preferred construction.

In connection with the orifices 9 it should be noted that they are preferably arranged about the walls of the cylinder 8 in the form of a helix the pitch of which bears a direct relation to the means for operating the cut-off mechanism which controls the said orifices. This cut-off mechanism consists, in the present instance, of a tube 10 telescoping with the cylinder 8 with a neat sliding fit and thus as it moves axially of said cylinder 8 it cuts off or opens, according to the direction of movement, one or more of said orifices.

The outer end of the tube 10 is suitably closed by a cap 11 which is mounted for sliding movement upon a rod 12, the cross section of which is preferably square so that any rotary movement of said rod will be transmitted to the cap 11 and thence to the tube 10. Since the tube 10 is formed with a screw thread 13 engaging a fixed screw threaded feed collar 14 it is evident that rotation of the tube 10 causes it to move axially and telescope more or less with the cylinder 8. Preferably the pitch of the screw threads 13 is the same as the pitch of the orifice helix so that each revolution of the tube 10 causes one row of orifices to be opened or closed according to the direction of axial movement of the tube 10. The rod 12 is suitably mounted axially of the tube 10 for rotary movement being journaled at one end on the pin 15 which is supported by the cylinder 8 and at the other end is arranged as above described.

16 designates a spindle secured to the rod 12 by a pin or key 17 and carrying on its projecting end a hand wheel 18 for operating purposes. A suitable stuffing box 19 in the cap 3 serves as a bearing for the spindle and also to prevent leakage as will be understood.

20 designates an indicating pointer fixed by suitable fastening devices 21 to the cap 3 and having its free indicating end 22 properly positioned with respect to the gage face or dial plate 23. This latter is arranged to rotate in definite relation to the movement of the hand wheel 18 and in the preferred construction one revolution of the dial plate 23 takes place while the hand wheel 18 is making thirty six revolutions. Since one revolution of the hand wheel 18 moves the tube 10 a distance sufficient to uncover a predetermined number of the orifices, it is evident there is a positive and fixed relation between the reading of the dial plate and the quantity of gas or fluid passing through the pipe orifices. The reduction gears, in the present instance, consist of a driven gear 24 fixed to the spindle 16 and meshing with a second gear 25 which carries a pinion 26 in mesh with the gear 27 fixed to the dial plate 23 as will be understood. While the reading of the dial plate 23 conforms to the number of orifices exposed to the flow, it is obvious that the small head or difference in pressure existing between the interior of cylinder 8 and the surrounding chamber 7 must be taken into account. For this purpose a U-tube gage is provided the leg 28 of which has communication with the chamber 7 by way of the conduit 29 and the leg 30 with the outlet conduit by way of pipe 31. The leg 30 is a sight glass communicating at all times with the leg 28 through the channel 32 and the U-tube is of course partially filled with a suitable liquid so that the differences in level may be readily determined.

33 designates an indicating scale adjustably mounted on the leg 30 for sliding movement and having a fixed pointer 34 as well as a movable pointer 35, the one indicating normal level conditions and the other level conditions under pressure. Hence the distance between the two pointers becomes a measure of the head or difference in pressure of the fluid or gas passing through the meter. With this in mind it is evident that a definite head may be taken as a working base and by adjusting the metering device to correspond to such head a reading may be had on the dial giving the true current flow.

In the operation of the instrument it is necessary to calibrate it by first passing a known fluid current through the casing and metering cylinder while adjusting the number of orifices exposed to flow until a certain predetermined fixed difference of pressure is indicated on the pressure gage. Thus for example, assuming the pressure gage has been set for a three inch difference of pressure it is next necessary to vary the orifice openings until they are properly adjusted to give a fluid flow corresponding to the head required and consequently this degree of opening of the orifices becomes a definite measure of the fluid flow. Thereafter working with this known difference of pressure as a base the measure of any given current can be quickly and accurately determined by the simple method of orifice adjustment.

Referring more particularly to Fig. 1, the operation may be explained more in detail as in that illustration the pressure gage has been set for a predetermined fixed difference of pressure as indicated by the position of the adjustable pointer 35. With an unknown current entering the casing through the inlet 5 it is first necessary to adjust the difference of pressure between the interior of the cylinder 8 and the chamber 7 until the gage indicates the required unit difference. This is done by rotating the hand wheel 18 which, through the spindle 16 and the rod 12, causes the tube 10 to rotate and consequently advance axially because of the thread feeding means. Since the pitch of the thread is the same as that of the orifice helix it is evident that each revolution of the hand wheel 18 causes the tube 10 to close the orifices one at a time, and this movement of the tube continues until the orifice openings have been varied or adjusted to give the predetermined difference in pressure as indicated by the gage. When this adjustment has been completed the exact rate of flow of the unknown current may be read from the dial 23 since this latter has been operated by the rotation of the hand wheel 18 and so moved as to indicate the exact data required.

In order to make direct readings for various pressures and temperatures, it will be understood that the meter is first calibrated for a number of different pressures and temperatures and a definite table of pressure and temperature values prepared, which is to be used in actual operation of the meter and from which the data for the proper adjustment can be obtained and thereafter, having adjusted the gage reading, it is possible to make a direct reading giving the information desired.

What I claim is:

1. In a fluid meter the combination of a casing provided with an inlet, a metering cylinder having a plurality of orifices and a discharge outlet, a pressure gage for indicating difference of pressure between said casing and cylinder and means governed in accordance with the number of orifices exposed to indicate the rate of fluid flow.

2. In a fluid meter the combination of a casing provided with an inlet, a metering cylinder in said casing having a plurality of orifices and a discharge outlet, a pressure gage to indicate difference of pressure between said casing and cylinder, a device having a definite relation to the number of orifices for indicating the fluid flow and common means for varying the number of orifices exposed to fluid flow and for setting said indicating device relative to the number of exposed orifices.

3. In a fluid meter the combination of a metering cylinder having a plurality of orifices arranged in the form of a helix, a pressure gage for indicating difference of pressure, means for successively varying the number of orifices exposed to flow, and means controlled by said orifice varying means for directly indicating the rate of fluid flow.

4. In a fluid meter the combination of a casing provided with an inlet, a metering cylinder having a plurality of orifices therein and a discharge outlet, said orifices being arranged in the form of a helix, a valve cooperating with said cylinder to open and close said orifices in succession, a pressure gage to indicate difference of pressure and means operating in conjunction with said valve and related to a predetermined difference of pressure for indicating the exact rate of flow.

5. In a fluid meter the combination of a casing provided with an inlet, a metering cylinder in said casing having a plurality of orifices and a discharge outlet, said orifices being arranged in the form of a helix, a pressure gage to indicate difference of pressure between said casing and cylinder, a valve in the form of a tube adapted to telescope with said cylinder, a thread on said tube, a fixed leader collar for said thread, said thread having the same pitch as the orifice helix whereby said valve tube is moved to open or close a predetermined number of orifices for each revolution of said tube.

6. In a fluid meter the combination of a casing provided with an inlet, a metering cylinder in said casing having a plurality of orifices and a discharge outlet, said orifices being arranged in the form of a helix, a pressure gage to indicate difference of pressure between said casing and cylinder, a valve in the form of a tube adapted to telescope with said cylinder, a thread on said tube, a fixed leader collar for said thread, said thread having the same pitch as the orifice helix whereby said valve tube is moved to open or close a predetermined number of orifices for each revolution of said tube and means controlled by said tube operating means for indicating the exact rate of flow.

EGBERT S. CARY.

Copies of this patent may be obtained for five cents each, by addressing the "Commissioner of Patents, Washington, D. C."